United States Patent [19]
Cave

[11] Patent Number: 5,898,767
[45] Date of Patent: Apr. 27, 1999

[54] CASUAL AGENT POOL

[75] Inventor: Ellis K. Cave, Garland, Tex.

[73] Assignee: InterVoice Limited Partnership, Reno, Nev.

[21] Appl. No.: 08/869,714

[22] Filed: Jun. 5, 1997

[51] Int. Cl.⁶ .................................................. H04M 3/42
[52] U.S. Cl. ............................................ 379/211; 379/265
[58] Field of Search .................................. 379/211, 214, 379/224, 216, 252, 266, 265, 268

[56] References Cited

U.S. PATENT DOCUMENTS

| | | | |
|---|---|---|---|
| 5,206,901 | 4/1993 | Harlow et al. ........................... | 379/211 |
| 5,309,513 | 5/1994 | Rose ........................................ | 379/265 |
| 5,329,578 | 7/1994 | Brennan et al. ...................... | 379/88.23 |
| 5,392,345 | 2/1995 | Otto ........................................ | 379/265 |
| 5,459,780 | 10/1995 | Sand ...................................... | 379/265 |
| 5,465,286 | 11/1995 | Clare et al. ............................ | 379/34 |
| 5,519,773 | 5/1996 | Dumas et al. ......................... | 379/265 |
| 5,548,636 | 8/1996 | Bannister et al. .................... | 379/201 |
| 5,557,668 | 9/1996 | Brady ..................................... | 379/212 |
| 5,633,924 | 5/1997 | Kaish et al. ........................... | 379/266 |
| 5,668,862 | 9/1997 | Bannister et al. .................... | 379/201 |
| 5,706,339 | 1/1998 | Eisdorfer et al. ..................... | 379/211 |
| 5,724,411 | 3/1998 | Eisdorfer et al. .................... | 379/93.23 |
| 5,724,418 | 3/1998 | Brady ..................................... | 379/212 |
| 5,742,675 | 4/1998 | Kilander et al. ...................... | 379/265 |
| 5,778,060 | 7/1998 | Otto ........................................ | 379/265 |

Primary Examiner—Krista Zele
Assistant Examiner—Charles N. Appiah
Attorney, Agent, or Firm—Fulbright & Jaworski L.L.P.

[57] ABSTRACT

A casual agent pool is provided to facilitate the management of a light load of inbound calls to a calling center where many employees (agents) may optionally answer those calls as part of their work duties. Agents may transact other business while logged onto the pool, and are alerted to the presence of an incoming call by, for example, the telephone ringing or a computer screen message. Casual agents may then choose whether or not to take an inbound call, depending on their circumstances. The system thus optimizes call agent resources in lightly-loaded applications having many potential agents available, allowing agents to transact other business while being potentially available to take calls, thereby obviating the need to manage a dedicated agent pool.

16 Claims, 4 Drawing Sheets

CASUAL AGENT POOL

TECHNICAL FIELD OF THE INVENTION

This invention relates generally to telephone call processing systems and more specifically to providing a pool of casual call answering agents, for whom answering inbound calls is only part of their work function.

BACKGROUND OF THE INVENTION

In a traditional call processing model, an answering agent pool typically comprises a fixed number of dedicated agents whose sole job it is to answer inbound calls. Such dedicated agents generally participate in the pool by headset and computer terminal. As a call comes in, an Automated Call Distribution ("ACD") resource queues the call for the next available agent. Dedicated agents enter and exit the pool from time to time. Upon entering, they attach to the ACD functionality by logging onto the pool, thereby making themselves available to receive calls. Upon exiting, they log off the pool and remove themselves from call answering availability.

In such dedicated pools, an agent's sole responsibility, generally, is to answer inbound calls. Systems are known where agents can make outbound sales calls while idle, but such systems tend to be expensive because the additional functionality greatly complicates the call distribution logic and the hardware that establishes audio paths to agents.

In a traditional call processing model using dedicated agents solely to answer calls, therefore, optimum use of call agent resources occurs when all agents are busy, since no single agent is then being paid to sit idle.

Modern businesses, however, are often characterized by having numerous employees who are capable of answering calls in an environment of light call load. A dedicated pool model can, in theory, be applied to such businesses by logging on selected employees as dedicated agents for full-time telephone answering duties. As call volume increases during a shift, a public address system advantageously calls up for dedicated agents to stop other duties and log on to take calls. This solution has disadvantages, however, in that the call distribution, call volume, and agent pool size have to be actively managed.

A better solution for businesses that typically experience light call volume is to provide a pool where a large group of employees may all be agents answering incoming calls on a casual basis. All casual agents log on to the casual agent pool, but may then immediately commence to transact other business. As incoming calls arrive and are distributed according to established distribution algorithms, casual agents may elect to either take calls or pass them, depending on what they are doing at the time.

It will be appreciated that there are many types of employees in modern businesses whose duties could include being an agent on a casual basis. Alternatively, or additionally, a casual agent pool could be used occasionally, and for brief periods, as an overflow pool to assist a dedicated pool at times when all available dedicated agents were busy. Such overflow responsibility, however, would have limited value over simply adding more agents to the dedicated pool.

There is therefore a need for a casual agent functionality in call processing systems. More specifically, there is a need for an ACD system enabling a casual agent pool for use by businesses typically experiencing low call traffic, and in which almost any employee may be a casual agent answering calls as well as performing other duties.

SUMMARY OF THE INVENTION

It will thus be understood that the present invention is directed to call processing in a casual agent pool. The present invention creates a casual agent pool whose agents can answer telephone calls as well as transacting other business during periods of light call traffic. Casual agents may also have special expertise to answer specific types of inbound calls. Agents in a casual pool may also help occasionally with overflow coverage for dedicated pools.

The present invention is therefore an advantageous alternative to traditional dedicated agent pools in selected circumstances. It will often be more convenient and economic to give a large group of casual agents a lightly-loaded call answering responsibility, in preference to actively managing a small group of dedicated agents answering calls full time.

The characteristics of a casual agent pool are different from a dedicated pool because casual agents are not required to receive a call at all times. In fact, a casual agent pool becomes effective over a dedicated pool only in times of low call traffic, such as, for example, where ACD calls take 25% or less of an agent's time. If call traffic to a casual pool is such that casual agents are spending, for example, over 50% of their time answering calls, then a dedicated pool may actually become more advantageous. This is because, as explained in more detail below, the casual pool's slight disadvantage over a dedicated pool is that customer call times can tend to be longer because the system has to "hunt" for an agent willing to take the call. Thus, if casual agents are spending most of their time answering calls anyway, those calls might as well be answered by a dedicated pool where call connection times tend to be shorter.

According to the present invention, casual agents log on to the casual pool. The agents may then transact other business while available to receive inbound calls. When an inbound call is received by the casual pool, an ACD distributes it to agents. This may be accomplished by several distribution methods, including, for example, by a "round robin" sequence, starting with a preselected agent, or a "cascading" sequence starting with a preselected agent, or alternatively again by alerting a number of agents simultaneously.

As agents are alerted by the ACD to the presence of an inbound call, the first to receive the alert may not be available to take the call. This agent may be busy transacting other business, or temporarily absent. A second or subsequent agent may take the call. It should be noted that in this context, "alert" may mean one of various methods of alerting a casual agent to the presence of a call, such as, for example, a distinctive ring, or a light on a telephone, or message on a computer screen.

It may also be that while transacting other business, the first casual agent is using his/her phone to place an outbound call or to receive an unrelated inbound call. The ACD does not alert a casual agent to the presence of an incoming call if it is detected that the casual agent's phone is already busy.

A further, somewhat serendipitous, advantage to casual agent pool functionality is that the effect of an agent forgetting to log off the pool is transparent to a caller. A problem in dedicated agent pools is that dedicated agents may leave their stations and forget to log off. In a dedicated agent pool this event leaves the ACD still believing that the absent agent is still available to take calls. The ACD will therefore forward the call to the agent whether he/she is there or not, and if that agent has left the station, the caller is stranded.

This problem will not occur, however, in a casual agent pool of the present invention. If a casual agent leaves his/her station and forgets to log off, and the system subsequently directs a call to that absent agent, the system merely routes the call to the next agent when it detects that the absent agent has not picked up the call.

It will be appreciated that, in distinction to a traditional dedicated pool, the call distribution algorithm (and enabling software and hardware) in a casual pool is more complex. In a dedicated pool, the algorithm is fairly straightforward in that it routes calls, in a predetermined sequence, to available agents who have logged on. An audio path already exists. The ACD simply connects an available agent to the caller.

In contrast, a casual agent pool ACD needs intelligence to detect and account for an agent not picking up a call, or the agent's line possibly being busy on unrelated business. Accordingly, the processing logic prior to establishing an audio path between caller and agent is more complicated. The casual agent pool ACD also has to affirmatively establish an audio path between the caller and the selected available agent once the agent is identified.

Optionally, the casual agent's telephone may also allow a casual agent to recognize an incoming agent pool call by distinctive alerts. One type of alert may indicate to the casual agent that the ACD wishes to send an incoming call. An alternative alert may indicate to the casual agent that a different type of incoming call is pending. Thus, the casual agent may decide whether or not to take a particular call at that time, depending on the casual agent's circumstances.

It should be emphasized that the advantages of the present invention are primarily directed towards optimizing call agent resources rather than reducing caller waiting time. In a dedicated model, calls are expected to be placed on hold when call agent resources are optimized (i.e. no dedicated agents are idle). However, when agents are available, the connection time is quick because the ACD immediately establishes an audio path directly to the available agent selected to receive the call.

In contrast, when a call is directed to the casual agent pool, the ACD will not know which potentially available casual agents will be willing or able to take a call at that precise moment. It will therefore take time to "hunt" for an available casual agent, during which time the caller will have to wait. Further, more time may be required to place a call to a casual agent since the ACD must affirmatively establish an audio path connecting the caller to the agent.

The disadvantage of potentially longer call connection time is significantly outweighed, however, by the casual agent pool's ability to be staffed by agents who can transact other business as well as answering inbound calls. The optimization of resources is self-evident.

Moreover, call distribution methods with a casual agent pool such as described herein, including the "cascade" and "simultaneous alert" methods, also tend to mitigate call connection delay. Additionally, control link functionality (where the casual agent ACD can exclude agents currently off hook from being alerted) may be used to mitigate call connection delay.

It is therefore a technical advantage of the present invention to allow more flexible use of call agent resources. Businesses whose call volume is typically low and in which many employees are potentially available to answer the phone part time gain advantage using a casual agent pool over use of a dedicated pool, which requires a higher degree of call agent management. A casual agent can transact other business and perform other tasks in addition to answering incoming calls. A casual agent can also elect, on a per-call basis, not to take routed calls.

A further technical advantage of the present invention is that it brings interim flexibility to a dedicated agent who may temporarily have to undertake other tasks or transact other business without interruption. In a traditional dedicated-only system, the dedicated agent has to log off the system if he/she is required to transact other business. Assume that the call volume to a casual pool was sufficiently light to enable the agent to spend, for example, 75% of her time temporarily transacting other business. In combination with the present invention, it would be advantageous for the originally dedicated agent to log off the dedicated pool and then immediately onto the casual pool, thus allowing the agent to receive incoming calls on a casual basis while also temporarily transacting other business.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
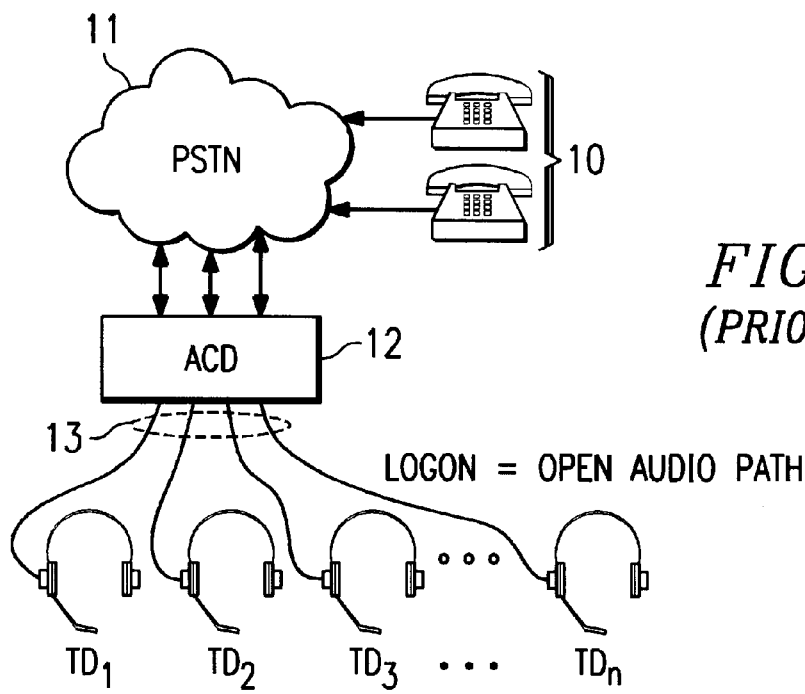
FIG. 1A is a block diagram illustrating exemplary architecture and topology in a dedicated agent pool of the current art.

FIG. 1A illustrates exemplary architecture and topology of a dedicated agent pool standard in the art. With reference to FIG. 1A, inbound calls from a plurality of call sources 10 are received over Public Switched Telephone Network ("PSTN") 11 by Automated Call Distribution ("ACD") resource 12. An exemplary ACD resource as illustrated in FIG. 1A is InterVoice's "InterDial" product. ACD resource 12 distributes inbound calls to dedicated agents via audio paths 13, said agents coming into voice communication with callers via telephony devices $TD_1$–$T_n$ (advantageously headsets).

As noted on FIG. 1A, audio paths 13 have a "logon=open audio path" aspect. That is, when a dedicated agent logs on to ACD 12, ACD 12 records the agent's presence and availability to receive calls. ACD 12 then opens an audio path between ACD 12 and the agent's telephony device $TD_1$–$TD_n$. ACD 12 then distributes inbound calls to available agents according to a preselected call distribution algorithm (e.g., longest idle agent, agent who has talked least, etc.). ACD 12 keeps track of which agents' lines are busy, and which are available. Since audio paths 13 are off hook, call distribution is essentially a switching function once the available agent designated to receive the call is identified. ACD 12 also advantageously warns an idle agent that a call is about to be connected by an audio signal in telephony device $TD_1$–$TD_n$) or on a computer screen (not illustrated).

It will be appreciated with reference to the foregoing description of FIG. 1A that a problem can occur if an agent leaves his/her station and forgets to log off. ACD 12 still thinks the agent is present and idle (because he/she has not logged off), and will eventually allocate a call to that station. The caller will be stranded because no one is at the telephony device $TD_1$–$TD_n$.

Figure 1B:
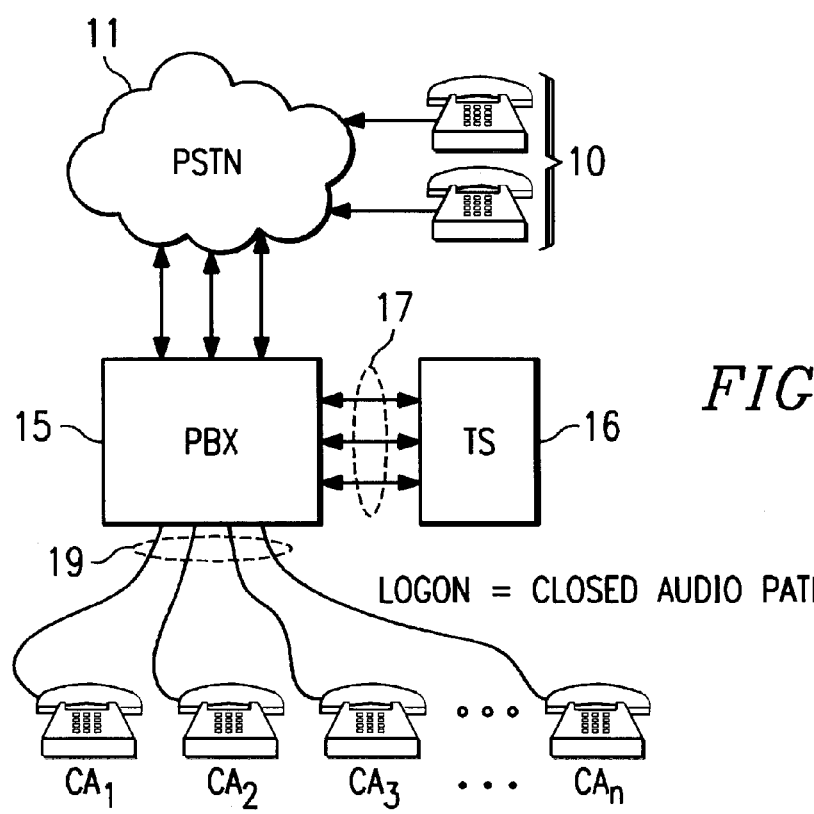
FIG. 1B is a block diagram illustrating exemplary architecture and topology in a first embodiment of a casual agent pool of the present invention.

FIG. 1B illustrates a first embodiment of a casual agent pool of the present invention, in which, as described above, casual agents $CA_1$–$CA_n$ may answer calls on a casual basis, and where such call answering duties may be interspersed with other work. As in FIG. 1A, inbound calls 10 are received over PSTN 11. In a preferred embodiment of the present invention as shown on FIG. 1B, however, call distribution is advantageously enabled with Private Branch Exchange ("PBX") 15 having ACD functionality and connected to Telephony Server ("TS") 16.

In contrast to FIG. 1A, and as shown on FIG. 1B, connections 19 between casual agents $CA_1$–$CA_n$ and PBX 15 have a "logon=closed audio path" aspect. That is, casual agents log on by calling TS 16 via connection 19, PBX 15 and connections 17. This informs TS 16 that a particular casual agent is available to take calls on a casual basis. Having logged on to the casual pool, either via telephone or computer terminal, casual agents then hang up (i.e. the audio path is closed) and commence other business while awaiting calls.

As calls come into PBX 15, TS 16 directs the calls via PBX 15 to casual agents $CA_1$–$CA_n$ according to a preselected distribution algorithm. In contrast to a dedicated pool as described above with reference to FIG. 1A, however, intelligence in TS 16 must respond to prevailing conditions in distributing calls to potentially available casual agents $CA_1$–$CA_n$. For example, a casual agent's line 19 may be busy when a particular call comes in. TS 16 must recognize this condition, skip this agent, and try the next agent in the distribution algorithm. The next casual agent may perhaps choose not to take the call because he/she is busy with other work. In this case, TS 16 must again recognize this condition (e.g., by three unanswered alerts, etc.), skip this agent, and try the next agent in the distribution algorithm. Finally, TS 16 must recognize when a casual agent takes a call (i.e. goes off hook) and must then establish an audio path between the caller and the agent via PBX 15.

It will be appreciated that when TS 16 distributes calls to casual agents $CA_1$–$CA_n$ as described above in "round robin" sequence, a caller may be required to hold for quite a long time while TS 16 hunts for an available agent who will take the call. Accordingly, TS 16 may alert a number of casual agents $CA_1$–$CA_n$, either simultaneously or in "cascade" sequence. In other words, TS 16 starts alerting subsequent agents before it gives up on a first agent. The first agent to answer receives the call. The "simultaneous" and "cascade" call distribution methods thus tend to reduce potential caller hold time, but the increased number of agent alerts may also tend to distract agents busy on other duties.

Recall also that as described in greater detail above, casual agents $CA_1$–$CA_n$ advantageously answer calls during periods of light call traffic, so that the agent resource management benefit of their being able concurrently to do other work compensates for the potentially longer call connection times. If casual agents $CA_1$–$CA_n$ are substantially busy answering calls, however, they may as well be dedicated agents working within a system as illustrated on FIG. 1A, in which call connection time to an available agent is substantially immediate.

It will also be noted that FIG. 1B illustrates casual agents $CA_1$–$CA_n$ with telephones to receive incoming calls. In such cases, a casual agent may be alerted to the presence of an incoming call by a traditional ring of the telephone, or an audible signal in a headset connected thereto. This arrangement is well suited to casual agents working at desks on paperwork, for example, or dealing with customers in person, where the agent requires an audible alert. Where an audible alert is distracting, a flashing light may be more advantageous. Alternatively, as illustrated on FIG. 1D and described in greater detail below, casual agents might be operating computers while being available to receive calls. In such cases, it would be advantageous to alert casual agents to the presence of an incoming call on the computer screen. As described below with reference to FIG. 1D, however, it will be appreciated that additional control links between TS 16 and the agents' computers are necessary to enable this.

A further enhancement consistent with the present invention is to have casual agents' telephones or computers announce more than one type of alert. For example, where telephones are disposed to make distinctive rings, one type of ring could signal to a casual agent that a casual agent pool call is pending, and a different type could signal that a non-agent pool call is pending. The casual agent may then decide whether to take the call based on the ring. Alternatively, different alerts on a computer screen may be used to achieve the same advantage.

Figure 1C:
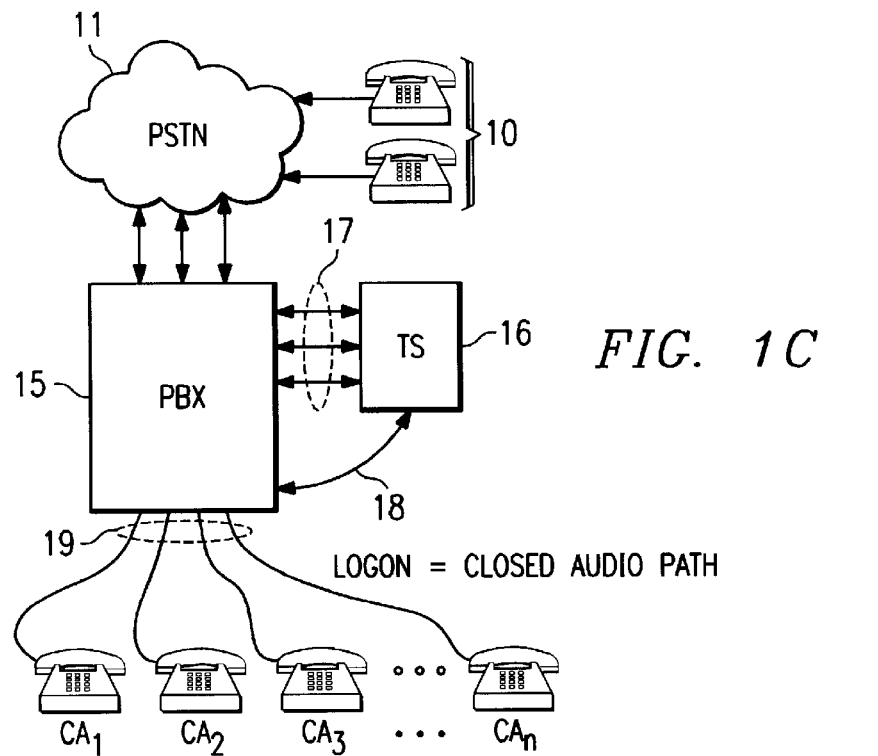
FIG. 1C is a block diagram illustrating exemplary architecture and topology in a second embodiment of a casual agent pool of the present invention.

Turning now to FIG. 1C, a second embodiment of the present invention is illustrated, in which control link 18 between TS 16 and PBX 15 enables TS 16 to monitor and determine when casual agents' lines 19 are off hook (implying that such casual agents are unavailable to be alerted to the presence of an incoming call). It will be appreciated that this monitoring feature of lines 19 facilitates the task of TS 16 to "hunt" for an available casual agent $CA_1$–$CA_n$ to take a call, thereby potentially reducing connection time for callers 10. In particular, this monitoring feature enables TS 16 to query PBX 15 directly as to which agents' lines 19 are busy, thereby eliminating the need to place a call to those agents.

Figure 1D:
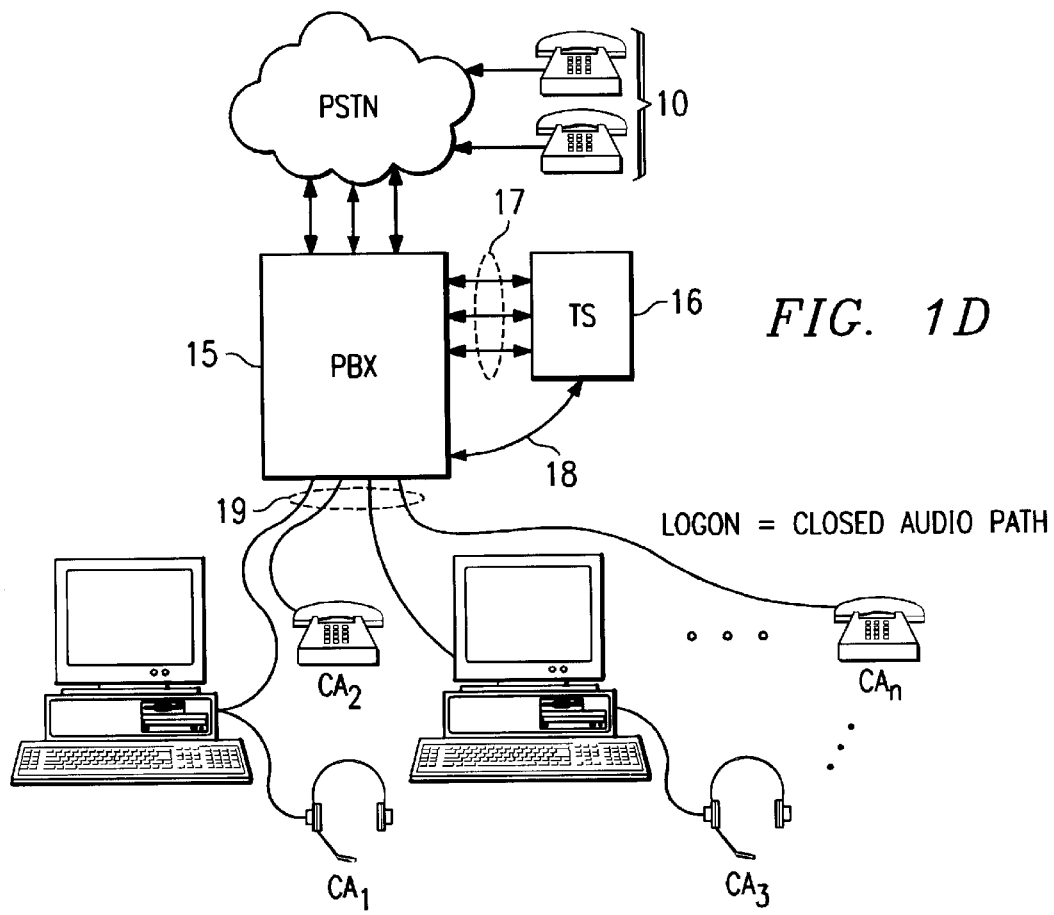
FIG. 1D is a block diagram illustrating exemplary architecture and topology in a third embodiment of a casual agent pool of the present invention.

In a third embodiment illustrated on FIG. 1D, casual agents $CA_1$–$CA_n$ may log on with computers as well as telephony devices. As noted above, in addition to audible alerts, a computer-equipped casual agent may also receive visual alerts to the presence of an incoming call on a monitor. A separate control link to the agent's computer terminal is generally necessary, however, to enable this feature.

Figure 2A:
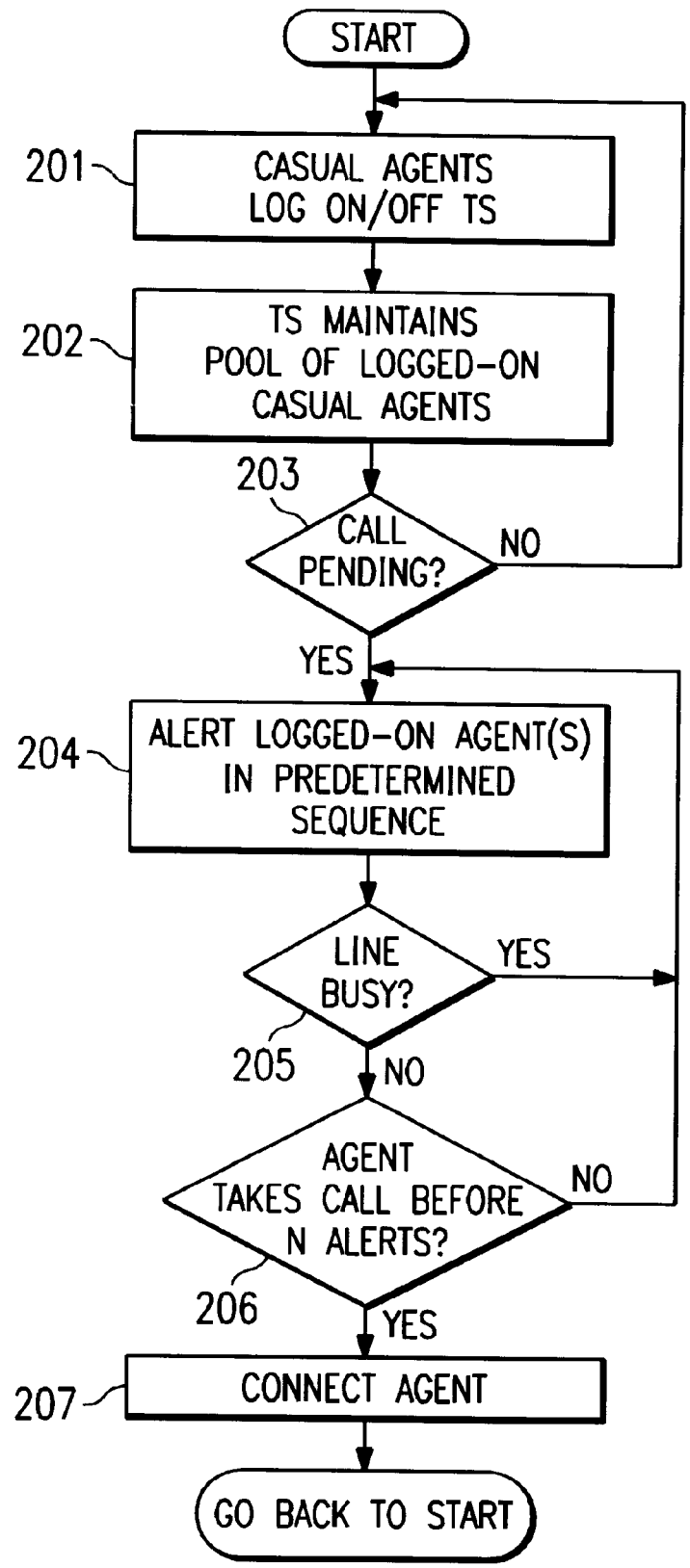
FIG. 2A is a flow diagram illustrating exemplary call distribution logic in the operation of an embodiment of the present invention as shown on FIG. 1B.

Turning now to FIG. 2A, exemplary call distribution logic in a casual agent group without control link 18 is illustrated, wherein the system connects an inbound call to a casual agent $CA_1$–$CA_n$ as shown on FIG. 1B. Casual agents log on and log off (block 201), and the system records their presence and availability (block 202). When an inbound call arrives (block 203), the next logged-on agent(s) according to a call distribution algorithm is/are selected and alerted (block 204). The system next determines if the line is busy (block 205). If so, the system returns to block 204 to select more agent(s). If not, the system then determines if an alerted agent takes the call (block 206). If not, the system again returns to block 204 to select more agent(s). If an agent does take the call, however, the system connects the call to the agent (block 207).

With reference to FIG. 2A, it will be seen that the processing logic of blocks 204, 205 and 206 in "hunting" for an available agent willing to take the call requires a substantial degree of "trial and error" before connection can be made. As noted above, this effect may tend to increase caller connection time, although "simultaneous"0 and "cascade" alerting features, also described above, may also mitigate the longer connection times. In particular, the step of alerting in block 204 may be enabled by alerting a predetermined number of casual agents simultaneously, or by "cascading" alerts in a preselected sequence. Both of these methods allow the system to bypass the "line busy" step in block 205, although the system is still subject to the "agent takes call before N alerts" step in block 206, since a casual agent must actually take a call before an audio path with the caller can be established.

Figure 2B:
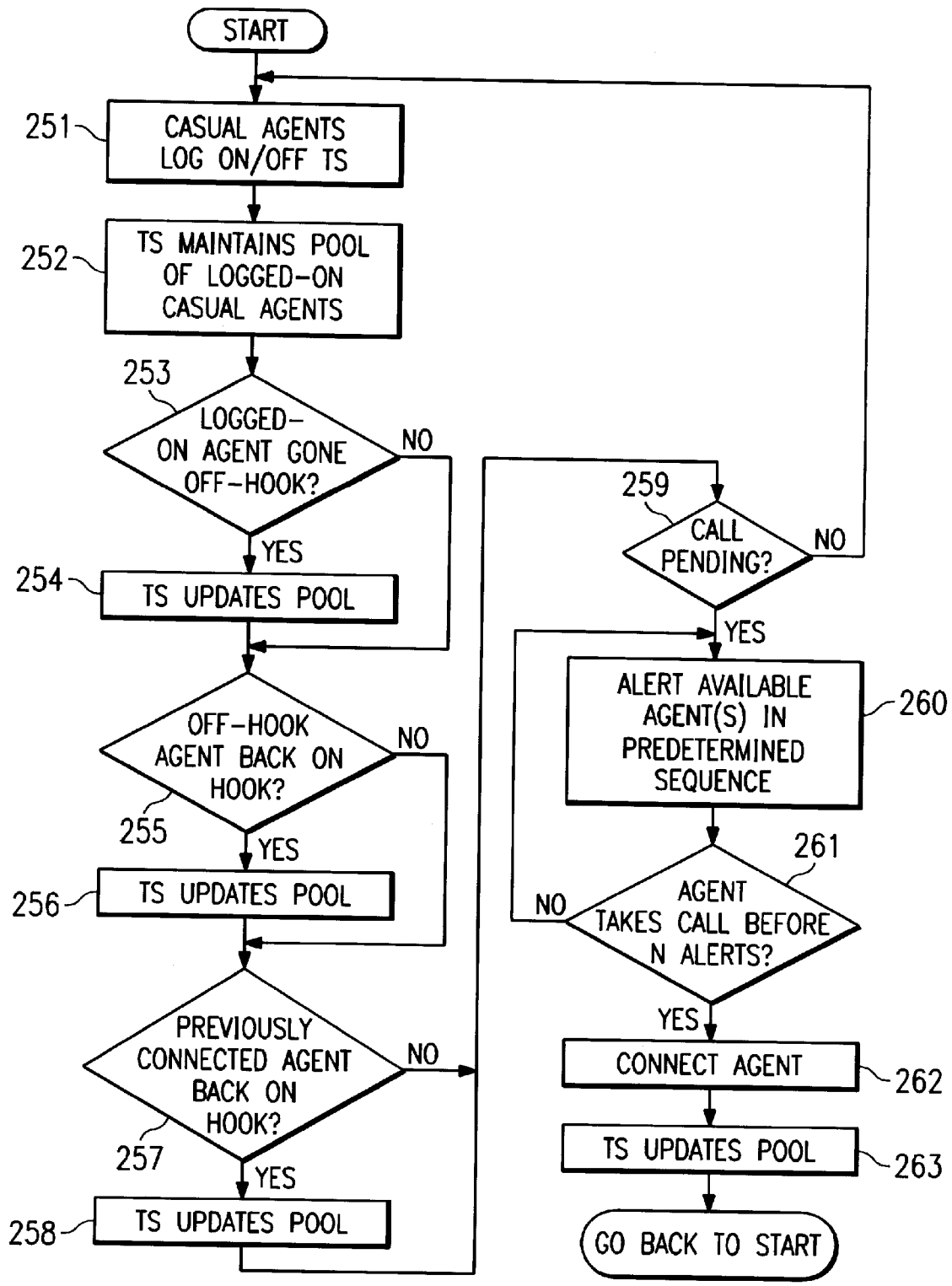
FIG. 2B is a flow diagram illustrating exemplary call distribution logic in the operation of an embodiment of the present invention as shown on FIGS. 1C or 1D.

Turning now to FIG. 2B, exemplary call distribution logic is illustrated wherein the added feature of a control link 18 between TS 16 and PBX 15 (as illustrated on FIGS. 1C and 1D) is shown to enable more sophisticated "hunting" for an available casual agent willing to take a call, thereby reducing potential caller connection times. In FIG. 2B, casual agents log on and log off the system (block 251) as before, and the system thereby maintains a pool of logged-on agents at its disposal (block 252). Through use of a control link, however, the system may now monitor and determine whether any of these logged-on agents in the potential pool need to be temporarily removed from the pool (or returned to the pool) because they are currently off hook (or have recently come back on hook). This additional information facilitates the "hunting" process for an available casual agent when an incoming call is received, since the system may now exclude from consideration those logged-on casual agents who are currently off hook.

With reference to FIG. 2B, therefore, the system first determines whether any logged-on agent previously recorded as on hook has gone off hook (block 253). If necessary, the pool is updated (block 254). Next, the system determines whether any logged-on agent previously recorded as off hook has come back on hook (block 255). Again, if necessary, the pool is updated (block 256). Next, the system determines whether any agent earlier connected to an inbound caller has come back on hook (block 257). Once more, if necessary, the pool is updated (block 258).

The system now has the most recent information regarding logged-on agents' potential availability to take calls by virtue of being on hook. If an incoming call is not pending at that time (block 259), the "on hook/off hook" checks advantageously repeat until an incoming call arrives. Potentially available agent(s) (i.e. those on hook) are then alerted in a predetermined sequence (block 260) that may include "simultaneous" or "cascading" alerting as described earlier in reference to block 204 on FIG. 2A.

Note that in comparison to FIG. 2A, it is now not necessary on FIG. 2B to do the "line busy" check of block 205 in FIG. 2A, since blocks 253–258 on FIG. 2B have already enabled the system to exclude off hook agents from this alert. Obviating the need for this check inevitably tends to reduce caller connection time.

On FIG. 2B, it is still necessary to hunt for an agent willing to take the call (block 261). Once an agent takes the call, the agent is connected to the caller (block 262) and the pool is updated (block 263). The processing sequence may then repeat.

Although the present invention and its advantages have been described in detail, it should be understood that various changes, substitutions and alterations can be made herein without departing from the spirit and scope of the invention as defined by the appended claims. In particular, the foregoing description has discussed the present invention in a currently preferred embodiment in which a casual agent pool is used to optimize call agent resources in a voice (telephone) medium. It will nonetheless be appreciated that consistent with the scope and spirit of the present invention, other applications thereof are possible. For example, casual agent pool functionality as described and claimed herein offers analogous advantages to management and moderation of real time on-line text communication by, for example, e-mail. Similarly, casual agent functionality as described and claimed herein may be used to manage multiple video transmissions. Accordingly, it will be seen that the present invention is independent of the medium in which communication is made.

I claim:

1. A casual agent pool, comprising:

a switch disposed to receive incoming calls from remote callers;

a telephony server;

a plurality of agents each having a corresponding terminal;

each agent disposed to become a casual agent by notifying the telephony server of said agent's availability to accept incoming calls on a selective basis;

each casual agent's terminal having a closed audio path thereto while idle; and the telephony server further comprising;

means for directing said incoming calls to casual agents' terminals according to a predetermined call distribution algorithm, wherein said predetermined call algorithm alerts selected logged-on casual agents according to a pattern selected from the group consisting of alerting a predetermined number of logged-on casual agents' terminals simultaneously and alerting selected logged-on casual agents' terminals in a cascading sequence;

means for alerting casual agents to whose terminals one of said incoming calls has been directed;

means for detecting when one of said alerted casual agents accepts one of said incoming calls on said selective basis; and means for connecting, via the switch, said incoming call to said accepting casual agent, said means for connecting including means for establishing voice communication between said accepting casual agent and the remote caller initializing said accepted incoming call.

2. The casual agent pool of claim 1, in which the predetermined call distribution algorithm also alerts selected casual agents' terminals sequentially.

3. The casual agent pool of claim 1, in which the telephony server further comprises:

means for detecting when casual agents' terminals are busy; and means for temporarily eliminating said busy casual agents' terminals from the predetermined call distribution algorithm.

4. The casual agent pool of claim 1, in which the means for alerting generates an audible signal.

5. The casual agent pool of claim 1, in which the means for alerting generates a visual signal.

6. The casual agent pool of claim 1, wherein said means for alerting casual agents comprises:

means for providing an alert distinctive to a casual agent pool call being pending.

7. A method for distributing incoming calls to agents who may take said calls on a casual basis, comprising the steps of:

(a) receiving incoming calls from remote callers through a switch;

(b) disposing a telephony server to control the incoming calls via the switch;

(c) providing a terminal to each of a plurality of agents;

(d) reclassifying agents as casual agents when said agents notify the telephony server of said agents' availability to accept incoming calls on a selective basis;

(e) maintaining a closed audio path to each casual agent's terminal while idle, and (f) managing each incoming call, said step (f) further comprising the substeps of:

(i) directing said incoming calls to idle casual agents' terminals according to a predetermined call distribution algorithm, wherein said predetermined call algorithm alerts selected logged-on casual agents according to a pattern selected from the group consisting of alerting a predetermined number of logged-on casual agents' terminals simultaneously and alerting selected logged-on casual agents' terminals in a cascading sequence;

(ii) alerting casual agents to whose terminal one of said incoming calls has been directed;

(iii) detecting when one of said casual agents whose terminals are idle accepts one of said incoming calls on said selective basis; and (iv) connecting, via the switch, said incoming call to said accepting casual agent, said substep (f)(iv) including the substep of establishing voice communication between said accepting casual agent and the remote caller initializing said accepted incoming call.

8. The method of claim 7, in which the predetermined call distribution algorithm also alerts selected agents' terminals sequentially.

9. The method of claim 7, in which the means for alerting generates an audible signal.

10. The method of claim 7, in which the means for alerting generating a visual signal.

11. The method of claim 7, wherein said alerting step utilizes an alert to distinguish an incoming call directed to said casual agents' terminals by said managing step over other calls.

12. A casual agent pool, comprising:

a switch disposed to receive incoming calls from remote callers;

a telephony server;

a plurality of agents each having a corresponding terminal;

each agent disposed to become a casual agent by notifying the telephony server of said agent's availability to accept incoming calls on a selective bases;

each casual agent's terminal having a closed audio path while idle; and the telephony server further comprising;

a computer program product having computer readable logic recorded thereon for distributing incoming calls to casual agents, the computer program product further comprising:

a computer-readable storage medium; and a computer program stored thereon, the computer program further comprising:

means for directing said incoming calls to casual agents' terminals according to a predetermined call distribution algorithm, wherein said predetermined call algorithm alerts selected logged-on casual agents according to a pattern selected from the group consisting of alerting a predetermined number of logged-on casual agents' terminals simultaneously and alerting selected logged-on casual agents' terminals in a cascading sequence;

means for alerting casual agents to whose terminals one of said incoming calls has been directed;

means for detecting when one of said alerted casual agents accepts one of said incoming calls on said selective basis; and means for establishing voice communication between said accepting casual agent and the remote call initializing said accepted incoming call.

13. The casual agent pool of claim 12, in which the predetermined call distribution algorithm also alerts selected casual agents' terminals sequentially.

14. The casual agent pool of claim 12, in which the computer program further comprises:

means for detecting when casual agents' terminals are busy; and means for temporarily eliminating said busy casual agents' terminals from the predetermined call distribution algorithm.

15. The casual agent pool of claim 12, in which the means for alerting generates an audible signal.

16. The casual agent pool of claim 12, in which the means for alerting generates a visual signal.

* * * * *